(12) United States Patent
Nakamura et al.

(10) Patent No.: US 10,128,031 B2
(45) Date of Patent: Nov. 13, 2018

(54) METHOD FOR MANUFACTURING MAGNETIC PARTICLES FROM A SILICON OXIDE-IRON CORE-SHELL STRUCTURE

(71) Applicants: NISSHIN SEIFUN GROUP INC., Tokyo (JP); NISSHIN ENGINEERING INC., Tokyo (JP)

(72) Inventors: Keitaroh Nakamura, Fujimino (JP); Akihiro Kinoshita, Fujimino (JP); Naohito Uemura, Fujimino (JP)

(73) Assignees: NISSHIN SEIFUN GROUP INC., Tokyo (JP); NISSHIN ENGINEERING INC., Tokyo (JP)

( * ) Notice: Subject to any disclaimer, the term of this patent is extended or adjusted under 35 U.S.C. 154(b) by 7 days.

(21) Appl. No.: 15/116,103

(22) PCT Filed: Jan. 20, 2015

(86) PCT No.: PCT/JP2015/051403
§ 371 (c)(1),
(2) Date: Aug. 2, 2016

(87) PCT Pub. No.: WO2015/118943
PCT Pub. Date: Aug. 13, 2015

(65) Prior Publication Data
US 2017/0186521 A1    Jun. 29, 2017

(30) Foreign Application Priority Data
Feb. 10, 2014    (JP) .................................. 2014-023851

(51) Int. Cl.
B22F 1/02    (2006.01)
B22F 9/20    (2006.01)
(Continued)

(52) U.S. Cl.
CPC .............. *H01F 7/02* (2013.01); *B22F 1/0018* (2013.01); *B22F 1/0048* (2013.01);
(Continued)

(58) Field of Classification Search
CPC .............. C01B 21/0622; C01P 2004/32; C01P 2004/62; C01P 2004/64; C01P 2006/42;
(Continued)

(56) References Cited

U.S. PATENT DOCUMENTS 6,319,485 B1    11/2001    Nagatomi et al.
2006/0283290 A1*    12/2006    Hattori .................... H01F 1/065
                                                                            75/348

(Continued)

FOREIGN PATENT DOCUMENTS

JP    8-108064 A    4/1996
JP    11-340023 A    12/1999
(Continued)

OTHER PUBLICATIONS

Guo et al, Formation of Magnetic FexOy/Silica Core-Shell Particles in a One-Step Flame Aerosol Process, Aerosol Sci. And Tech., 44:281-291, 2010.*
(Continued)

*Primary Examiner* — Hoa (Holly) Le
(74) *Attorney, Agent, or Firm* — Muncy, Geissler, Olds & Lowe, P.C.

(57) ABSTRACT

Provided is a method for manufacturing magnetic particles, in which an oxidation treatment, a reduction treatment, and a nitriding treatment are performed in that order on raw material particles with a core-shell structure in which a silicon oxide layer is formed on the surfaces of iron microparticles, thereby nitriding the iron microparticles while maintaining the core-shell structure. Due to this configuration, granular magnetic particles with a core-shell
(Continued)

structure in which a silicon oxide layer is formed on the surfaces of iron nitride microparticles can be obtained.

16 Claims, 4 Drawing Sheets

(51) Int. Cl.
H01F 7/02 (2006.01)
B22F 1/00 (2006.01)
B22F 7/06 (2006.01)
C22C 33/02 (2006.01)
H01F 1/06 (2006.01)

(52) U.S. Cl.
CPC .............. B22F 1/0088 (2013.01); B22F 1/02 (2013.01); B22F 7/062 (2013.01); C22C 33/02 (2013.01); H01F 1/061 (2013.01); B22F 2998/10 (2013.01); B22F 2999/00 (2013.01); C22C 2202/02 (2013.01)

(58) Field of Classification Search
CPC ........ Y10T 428/2991; B01J 2/16; B22F 1/02; B22F 9/20; B22F 9/22; B22F 2301/35; B22F 2302/20; B22F 2998/10
USPC ............................ 427/212–220, 255.2, 255.7
See application file for complete search history.

(56) References Cited

U.S. PATENT DOCUMENTS

2012/0244356 A1 9/2012 Takahashi et al.
2013/0257573 A1 10/2013 Takahashi et al.
2014/0001398 A1 1/2014 Takahashi et al.

FOREIGN PATENT DOCUMENTS

| JP | 2007250096 A | 9/2007 |
| JP | 2007-258427 A | 10/2007 |
| JP | 2011-91215 A | 5/2011 |
| JP | 2012-69811 A | 4/2012 |
| JP | 2012-149326 A | 8/2012 |

OTHER PUBLICATIONS

Guo et al., Formation of Magnetic FexOy/Silica Core-Shell Particles in a One-Step Flame Aerosol Process, Aerosol Science and Technology, 44:281-291, 2010 (Year: 2010).*

* cited by examiner

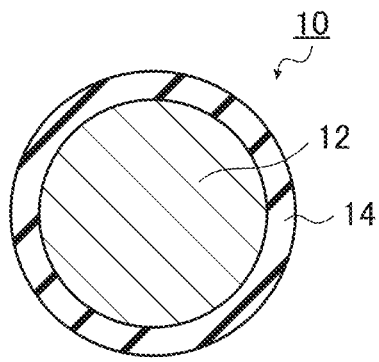 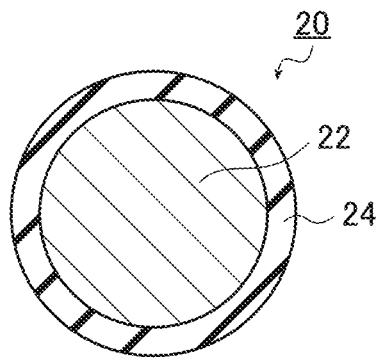
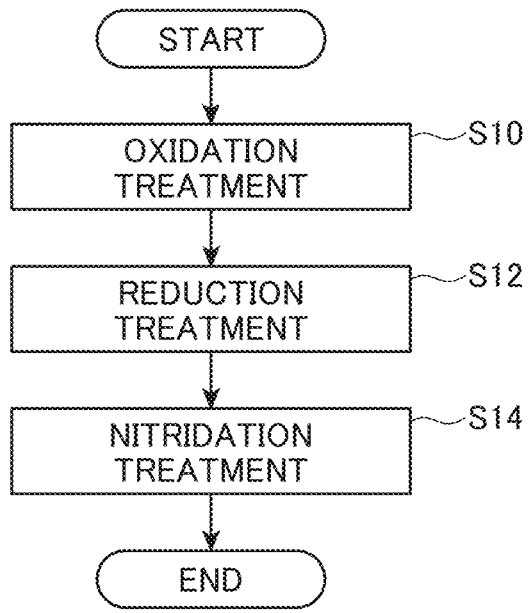

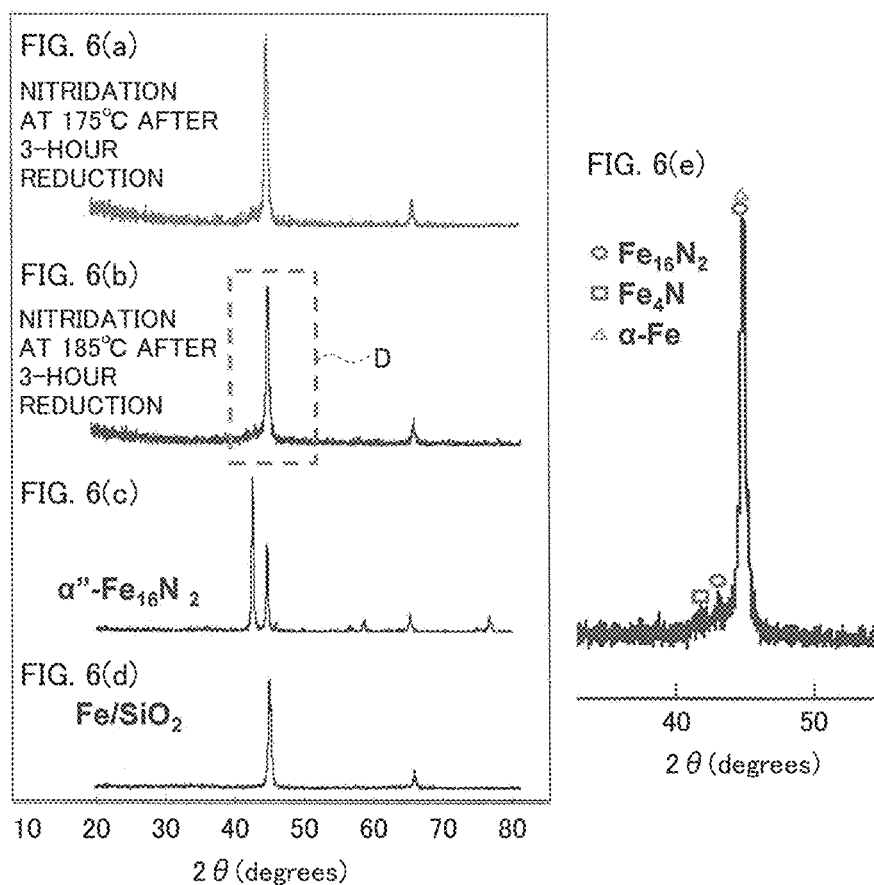

US 10,128,031 B2

METHOD FOR MANUFACTURING MAGNETIC PARTICLES FROM A SILICON OXIDE-IRON CORE-SHELL STRUCTURE

TECHNICAL FIELD

The present invention relates to spherical magnetic particles each having a core-shell structure in which a silicon oxide layer is formed on the surface of an iron nitride fine particle, a method for manufacturing such spherical magnetic particles, and a magnetic body using such spherical magnetic particles.

BACKGROUND ART

Today, motors for hybrid vehicles, electric vehicles, home electric appliances such as air conditioners and washing machines, industrial machinery and the like are required to have energy-saving, high efficiency and high performance characteristics. Accordingly, magnets used for such motors are required to have a higher magnetic force (coercive force, saturation magnetic flux density). At present, iron nitride-based magnetic particles are attracting attention as magnetic particles used to form a magnet, and various proposals have been made on such iron nitride-based magnetic particles (see Patent Literatures 1 to 3).

Patent Literature 1 describes ferromagnetic particles which comprise an $Fe_{16}N_2$ single phase, have surfaces coated with an Si compound and/or an Al compound and have a $BH_{max}$ value of not less than 5 MGOe. The ferromagnetic particles can be obtained by coating the surfaces of iron compound particles with the Si compound and/or the Al compound, followed by reduction treatment and then nitridation treatment. The iron compound particles used as a starting material are composed of iron oxide or iron oxyhydroxide.

Patent Literature 2 describes ferromagnetic particles which comprise an $Fe_{16}N_2$ compound phase in an amount of not less than 70% as measured by Mössbauer spectrum, contain a metal element X in such an amount that a molar ratio of the metal element X to Fe is 0.04 to 25%, have surfaces coated with an Si compound and/or an Al compound and have a $BH_{max}$ value of not less than 5 MGOe. The metal element X is at least one element selected from the group consisting of Mn, Ni, Ti, Ga, Al, Ge, Zn, Pt and Si.

The ferromagnetic particles are obtained by subjecting iron compound particles previously passed through a mesh having a size of not more than 250 μm to reduction treatment and then to nitridation treatment, the iron compound particles used as a starting material being formed of iron oxide or iron oxyhydroxide which has a BET specific surface area of 50 to 250 m²/g, an average major axis diameter of 50 to 450 nm and an aspect ratio (major axis diameter/minor axis diameter) of 3 to 25 and comprises a metal element X (wherein X is at least one element selected from the group consisting of Mn, Ni, Ti, Ga, Al, Ge, Zn, Pt and Si) in such an amount that a molar ratio of the metal element X to Fe is 0.04 to 25%.

Patent Literature 3 describes ferromagnetic particles comprising an $Fe_{16}N_2$ compound phase in an amount of not less than 80% as measured by Mössbauer spectrum, and each having an outer shell in which FeO is present in the form of a film having a thickness of not more than 5 nm.

The ferromagnetic particles are obtained by subjecting iron oxide or iron oxyhydroxide having an average major axis diameter of 40 to 5000 nm and an aspect ratio (major axis diameter/minor axis diameter) of 1 to 200 as a starting material to dispersing treatment to prepare aggregated particles having D50 of not more than 40 μm and D90 of not more than 150 μm, allowing the obtained aggregated particles to pass through a mesh having a size of not more than 250 μm, subjecting the iron compound particles passed through the mesh to hydrogen reduction treatment at a temperature of 160 to 420° C. and then subjecting the resulting particles to nitridation treatment at a temperature of 130 to 170° C.

CITATION LIST

Patent Literature

Patent Literature 1: JP 2011-91215 A
Patent Literature 2: JP 2012-69811 A
Patent Literature 3: JP 2012-149326 A

SUMMARY OF INVENTION

Technical Problems

In Patent Literatures 1 to 3 above, while the magnetic particles with a minor axis diameter and a major axis diameter differing in length are obtained, spherical magnetic particles cannot be obtained. The magnetic particles with a minor axis diameter and a major axis diameter differing in length have anisotropy in terms of magnetic properties. Furthermore, the magnetic particles obtained in Patent Literatures 1 to 3 tend to be fused during reduction treatment at high temperature and are poor in dispersibility.

An object of the present invention is to solve the above problems inherent in the prior art and to provide a method for manufacturing magnetic particles that enables the manufacture of spherical magnetic particles each having a core-shell structure in which a silicon oxide layer is formed on the surface of an iron nitride fine particle, as well as such spherical magnetic particles and a magnetic body using such spherical magnetic particles.

Solution to Problems

In order to attain the above object, the present invention provides as its first aspect a magnetic particle manufacturing method, comprising: an oxidation treatment step of subjecting raw particles each having a core-shell structure in which a silicon oxide layer is formed on a surface of an iron fine particle to oxidation treatment; a reduction treatment step of subjecting the raw particles having undergone the oxidation treatment to reduction treatment; and a nitridation treatment step of subjecting the raw particles having undergone the reduction treatment to nitridation treatment to nitride iron fine particles with the core-shell structure being maintained.

Preferably, the oxidation treatment is performed on the raw particles in air at 100° C. to 500° C. for 1 to 20 hours. More preferably, the oxidation treatment is performed at 200° C. to 400° C. for 1 to 10 hours.

Preferably, the reduction treatment is performed at 200° C. to 500° C. for 1 to 50 hours as mixed gas of hydrogen gas and nitrogen gas is supplied to the raw particles. More preferably, the reduction treatment is performed at 200° C. to 400° C. for 1 to 30 hours.

Preferably, the nitridation treatment is performed at 140° C. to 200° C. for 3 to 50 hours as nitrogen element-containing gas is supplied to the raw particles. More preferably, the nitridation treatment is performed at 140° C. to 160° C. for 3 to 20 hours.

Preferably, the raw particles take on a spherical shape and have a particle size of less than 200 nm and more preferably of 5 to 50 nm.

The present invention provides as its second aspect magnetic particles being spherical particles each having a core-shell structure in which a silicon oxide layer is formed on a surface of an iron nitride fine particle.

The present invention provides as its third aspect a magnetic body formed using spherical particles each having a core-shell structure in which a silicon oxide layer is formed on a surface of an iron nitride fine particle.

Advantageous Effects of Invention

According to the present invention, it is possible to obtain spherical magnetic particles each having a core-shell structure in which a silicon oxide layer is formed on the surface of an iron nitride fine particle. The obtained spherical magnetic particles each have the surface constituted by the silicon oxide layer and therefore, the iron nitride fine particles do not come into direct contact with each other. Furthermore, owing to the silicon oxide layer that is an insulator, each iron nitride fine particle is electrically isolated from another particle, and this can prevent electric current from flowing between adjacent magnetic particles. As a result, damage caused by electric current can be reduced or prevented.

Since fine particles are composed of iron nitride, magnetic particles of the invention and a magnetic body produced using such magnetic particles have a high coercive force and excellent magnetic properties.

BRIEF DESCRIPTION OF DRAWINGS

FIG. 1 (*a*) is a schematic cross-sectional view showing a magnetic particle of the invention, and (*b*) is a schematic cross-sectional view showing a raw particle.

FIG. 2 is a flow chart showing a method of manufacturing magnetic particles of the invention.

FIGS. 6 (*a*) and (*b*) are graphs showing results of crystal structure analysis by X-ray diffractometry made on raw particles having undergone nitridation treatment; (*c*) is a graph showing a result of crystal structure analysis by X-ray diffractometry made on Fe16N2 serving as a reference; (*d*) is a graph showing a result of crystal structure analysis by X-ray diffractometry made on the raw particles having yet to undergo nitridation treatment; and (*e*) is an enlarged view of an important portion of FIG. 6(*b*).

DESCRIPTION OF EMBODIMENTS

A method for manufacturing magnetic particles, magnetic particles and magnetic body according to the invention are described below in detail with reference to preferred embodiments shown in the accompanying drawings.

Figure 3:
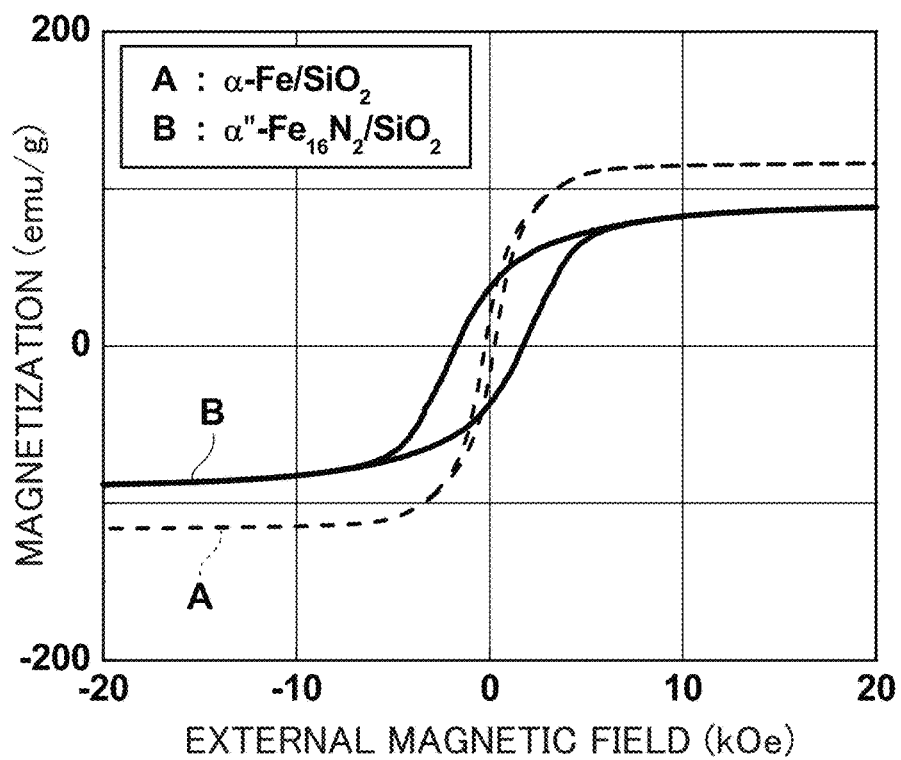
FIG. 3 is a graph showing an example of magnetic hysteresis curves (B-H curves) of magnetic particles and raw particles.

FIG. 1(*a*) is a schematic cross-sectional view showing a magnetic particle of the invention, and FIG. 1(*b*) is a schematic cross-sectional view showing a raw particle. FIG. 2 is a flow chart showing a method of manufacturing magnetic particles of the invention. FIG. 3 is a graph showing an example of magnetic hysteresis curves (B-H curves) of magnetic particles and raw particles.

As shown in FIG. 1(*a*), a magnetic particle 10 of this embodiment is a spherical particle having a core-shell structure in which a silicon oxide layer ($SiO_2$ layer) 14 (shell) is formed on the surface of an iron nitride fine particle 12 (core).

The magnetic particle 10 is a spherical particle having a particle size of about 50 nm and preferably of 5 to 50 nm. The particle size is obtained by converting a measurement value of the specific surface area.

In the magnetic particle 10, the iron nitride fine particle 12 exerts magnetic properties. Among iron nitrides, $Fe_{16}N_2$ having excellent magnetic properties is most preferred in terms of magnetic properties such as coercive force. Therefore, it is most preferable that the fine particle 12 be constituted by an $Fe_{16}N_2$ single phase. When the fine particle 12 is constituted by the $Fe_{16}N_2$ single phase, the magnetic particle 10 is also referred to as "$Fe_{16}N_2/SiO_2$ composite fine particle."

The fine particle 12 is not limited to the $Fe_{16}N_2$ single phase and may have the composition having another iron nitride included therein.

The silicon oxide layer 14 serves to electrically insulate the fine particle 12, prevent the fine particle 12 from coming into contact with another magnetic particle or the like and inhibit oxidation or the like of the iron nitride fine particle 12. The silicon oxide layer 14 is an insulator.

Owing to the iron nitride fine particle 12, the magnetic particle 10 has a high coercive force and excellent magnetic properties. As will be described in detail later, when the fine particle 12 is composed of the $Fe_{16}N_2$ single phase, the coercive force is to be, for instance, 1700 Oe (about 135.3 kA/m). The magnetic particle 10 also has excellent dispersibility.

In the magnetic particle 10, the silicon oxide layer 14, which is an insulator, serves to prevent electric current from flowing between magnetic particles 10, thereby reducing or preventing damage caused by electric current.

A magnetic body formed using such magnetic particles 10 has a high coercive force and excellent magnetic properties. One example of the magnetic body is a bonded magnet.

Next, a method for manufacturing the magnetic particles 10 is described.

To manufacture the magnetic particles 10, raw particles 20, one of which is shown in FIG. 1(*b*), are prepared.

Next, as shown in FIG. 2, the raw particles 20 are subjected to oxidation treatment to oxidize iron (Fe) fine particles 22 (Step S10). Subsequently, the raw particles 20 are subjected to reduction treatment to reduce the oxidized iron (Fe) fine particles 22 (Step S12). Thereafter, the raw particles 20 are subjected to nitridation treatment to nitride the reduced iron (Fe) fine particles 22 (Step S14). The magnetic particles 10 having the iron nitride fine particles 12 can be thus manufactured.

The raw particles 20 each have a core-shell structure in which a silicon oxide layer 24 is formed on the surface of the iron (Fe) fine particle 22. The raw particle 20 is also referred to as "Fe/$SiO_2$ particle."

The raw particle 20 is a spherical particle having a particle size of about 50 nm and preferably 5 to 50 nm. The particle size is obtained by converting a measurement value of the specific surface area.

As described above, the iron fine particles 22 are oxidized in the oxidation treatment step (Step S10), subsequently the oxidized iron fine particles 22 are reduced in the reduction treatment step (Step S12), and then the iron fine particles 22 are nitrided in the nitridation treatment step (Step S14), thereby obtaining fine particles composed of iron nitride and most preferably of $Fe_{16}N_2$. In this regard, the silicon oxide layer 24 is a stable substance which does not change through oxidation treatment, reduction treatment or nitridation treatment. Thus, the iron fine particles 22, which are cores, are oxidized, reduced and nitrided to be changed into the iron nitride fine particles 12 with the core-shell structure being maintained, to thereby obtain the magnetic particles 10 of FIG. 1(a).

As described later, the magnetic particles 10 thus manufactured are free from aggregation and have high dispersibility.

In the present invention, the magnetic particles 10 can be manufactured by subjecting the raw particles 20 to oxidation treatment, reduction treatment and nitridation treatment.

Methods of oxidation treatment include a method in which: the raw particles 20 are put into, for example, a glass container; air is supplied into this container; and the raw particles 20 are subjected to oxidation treatment in air at 100° C. to 500° C. for 1 to 20 hours. More preferably, oxidation treatment is performed at 200° C. to 400° C. for 1 to 10 hours.

At an oxidation treatment temperature of less than 100° C., the degree of oxidation is not sufficient. At an oxidation treatment temperature in excess of 500° C., the raw particles are fused. In addition, the oxidation reaction is saturated so that the oxidation does not progress any more.

With an oxidation treatment time of less than 1 hour, the degree of oxidation is not sufficient. With an oxidation treatment time in excess of 20 hours, the raw particles are fused. In addition, the oxidation reaction is saturated so that the oxidation does not progress any more.

Methods of reduction treatment include a method in which: the raw particles 20 having undergone the oxidation treatment are put into, for example, a glass container; mixed gas of $H_2$ gas (hydrogen gas) and $N_2$ gas (nitrogen gas) is supplied into this container; and the raw particles 20 are subjected to reduction treatment in the atmosphere of the mixed gas at 200° C. to 500° C. for 1 to 50 hours. More preferably, reduction treatment is performed at 200° C. to 400° C. for 1 to 30 hours.

The upper-limit concentration of the hydrogen gas in the mixed gas is about 4 vol % (that is, lower than the flammability limit).

Methods of reduction treatment also include a method using $H_2$ gas (hydrogen gas) alone, other than the foregoing method using the mixed gas. In other words, reduction treatment may be carried out with a hydrogen gas concentration of 100 vol %. A lower hydrogen gas concentration is preferred for ease of handling.

At a reduction treatment temperature of less than 200° C., the degree of reduction is not sufficient. At a reduction treatment temperature in excess of 500° C., the raw particles are fused while the reduction reaction is saturated so that the reduction does not progress any more.

With a reduction treatment time of less than 1 hour, the degree of reduction is not sufficient. With a reduction treatment time in excess of 50 hours, the raw particles are fused while the reduction reaction is saturated so that the reduction does not progress any more.

Methods of nitridation treatment include a method in which: the raw particles 20 are put into, for example, a glass container; nitrogen element-containing gas such as $NH_3$ gas (ammonia gas) is supplied as a nitrogen source into this container; and the raw particles 20 are subjected to nitridation treatment in the presence of the $NH_3$ gas (ammonia gas) at 140° C. to 200° C. for 3 to 50 hours. More preferably, nitridation treatment is performed at 140° C. to 160° C. for 3 to 20 hours.

At a nitridation treatment temperature of less than 140° C., the degree of nitridation is not sufficient. At a nitridation treatment temperature in excess of 200° C., the raw particles are fused while the nitridation is saturated.

The nitridation treatment time is preferably 3 to 50 hours. At a nitridation treatment time of less than 3 hours, the degree of nitridation is not sufficient. At a nitridation treatment time in excess of 50 hours, the raw particles are fused while the nitridation is saturated.

While the raw particles 20 of FIG. 1(b) are used as a raw material as described above, the invention is not limited thereto. The raw material may be a mixture of the raw particles 20 and another type of particles. Another type of particles have a size substantially the same as that of the raw particles 20 and each have a core-shell structure in which an iron oxide layer is formed on the surface of an iron (Fe) fine particle. The iron oxide is not particularly limited, and examples thereof include $Fe_2O_3$ and $Fe_3O_4$.

It has been confirmed that when the above-described oxidation treatment step, reduction treatment step and nitridation treatment step are performed with the use of the mixture of the raw particles 20 and another type of particles as a raw material, with the proportion of the other type of particles being about 50 vol %, the magnetic particles 10 of FIG. 1(a) are of course manufacture, and in addition, magnetic particles each having a core-shell structure in which an iron oxide layer (shell) is formed on the surface of an iron nitride fine particle (core) are manufactured. It has been also confirmed that the foregoing magnetic particles having the iron oxide layers have a size substantially the same as that of the magnetic particles 10 of FIG. 1(a). Furthermore, the magnetic particles 10 and the foregoing magnetic particles having the iron oxide layers do not adhere to each other but disperse.

It has been confirmed that even when the mixture of the raw particles 20 and the other type of particles as above is used as a raw material, with the proportion of the other type of particles being about 50 vol %, and merely subjected to nitridation treatment, the magnetic particles and the foregoing magnetic particles having the iron oxide layers can be manufactured with substantially the same particle sizes and do not adhere to each other but disperse. Thus, even when the mixture of the raw particles and the other type of particles is used as a raw material, the magnetic particles 10 can be obtained and in addition, the magnetic particles having the iron oxide layers as above can be obtained.

In the present invention, none of oxidation, reduction and nitridation treatment methods is limited to the foregoing illustrative methods as long as the iron fine particles 22, which are cores, can be oxidized, reduced and nitrided and thereby changed into the iron nitride fine particles 12 with the core-shell structure of the raw particles 20 as a raw material being maintained.

The raw particles 20 (Fe/SiO$_2$ particles) of FIG. 1(b) can be produced by a method of producing superfine particles using thermal plasma as disclosed by, for example, JP 4004675 B (a method of producing oxide-coated metallic fine particles), and therefore, a detailed explanation thereof will not be made. It should be noted that a method of producing the raw particles 20 is not limited to methods using thermal plasma as long as the raw particles 20 (Fe/SiO$_2$ particles) can be produced.

The raw particles 20 used as a raw material and the magnetic particles 10 were measured for magnetic properties. The results are shown in FIG. 3.

As shown in FIG. 3, magnetic hysteresis curves (B-H curves) denoted by A were obtained with the material particles 20, while magnetic hysteresis curves (B-H curves) denoted by B were obtained with the magnetic particles 10. As can be seen from the magnetic hysteresis curves A and B, the magnetic particles 10 have more excellent magnetic properties. Having the iron nitride fine particles 12 as cores, the magnetic particles 10 can have a coercive force of, for instance, 1700 Oe (about 135.3 kA/m) which is higher than that of the raw particles 20 having iron cores. In addition, the magnetic particles 10 can have a saturation magnetic flux density of 93.5 emu/g (about $1.15 \times 10^{-4}$ Wb·m/kg).

The present applicants used raw particles (Fe/SiO$_2$ particles) with an average particle size of 10 nm as a raw material and subjected the raw particles (Fe/SiO$_2$ particles) to oxidation treatment, reduction treatment and nitridation treatment in this order, thereby manufacturing magnetic particles. The raw particles in the manufacturing process and the manufactured magnetic particles were analyzed for their crystal structures by X-ray diffractometry, and their states were observed with TEM (transmission electron microscope). Results were obtained as shown in FIGS. 4(a) to 4(c) and FIGS. 5(a) to 5(f).

Figure 4:
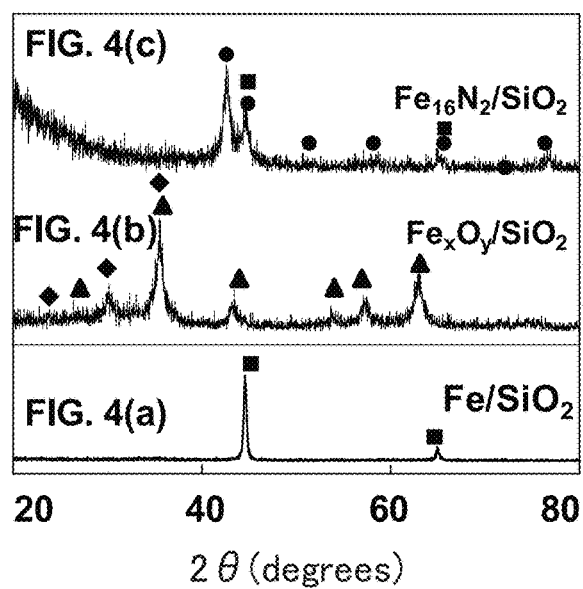
FIG. 4 (*a*) is a graph showing a result of crystal structure analysis by X-ray diffractometry made on raw particles having yet to undergo treatment; (*b*) is a graph showing a result of crystal structure analysis by X-ray diffractometry made on the raw particles having undergone oxidation treatment; and (*c*) is a graph showing a result of crystal structure analysis by X-ray diffractometry made on magnetic particles obtained through, after the oxidation treatment, reduction treatment and then nitridation treatment.

FIG. 4(a) is a graph showing a result of crystal structure analysis by X-ray diffractometry made on raw particles having yet to undergo treatment; FIG. 4(b) is a graph showing a result of crystal structure analysis by X-ray diffractometry made on the raw particles having undergone oxidation treatment; and FIG. 4(c) is a graph showing a result of crystal structure analysis by X-ray diffractometry made on magnetic particles obtained through, after the oxidation treatment, reduction treatment and then nitridation treatment.

Figure 5A:
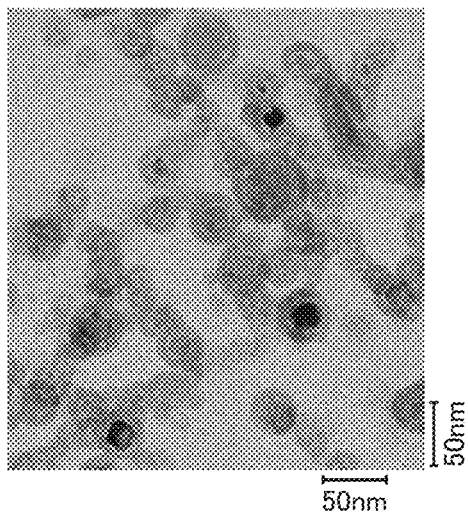
FIG. 5 includes images corresponding to FIG. 4(*a*) to FIG. 4(*c*). (a) is a schematic view showing a TEM image of the raw particles having yet to undergo treatment; (b) is an enlarged view of FIG. 5(*a*); (c) is a schematic view showing a TEM image of the raw particles having undergone oxidation treatment; (d) is an enlarged view of FIG. 5(*c*); (e) is a schematic view showing a TEM image of the magnetic particles; and (f) is an enlarged view of FIG. 5(*e*).
Figure 5B:
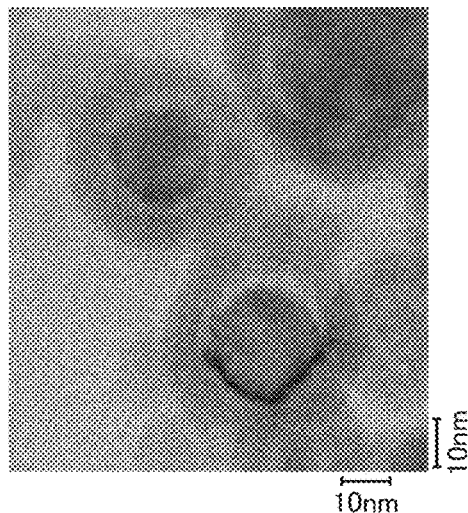
Figure 5C:
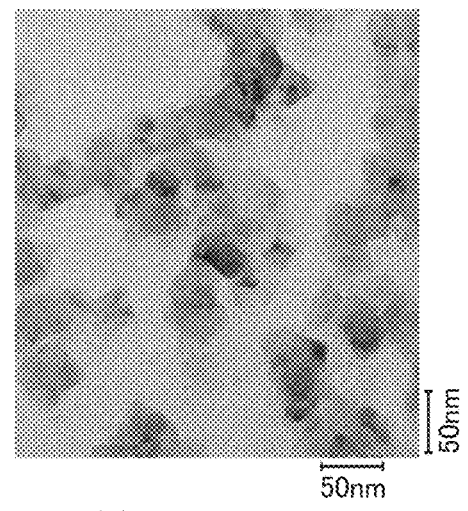
Figure 5D:
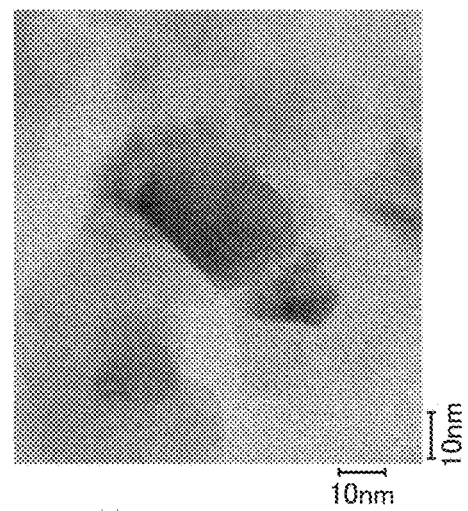
Figure 5E:
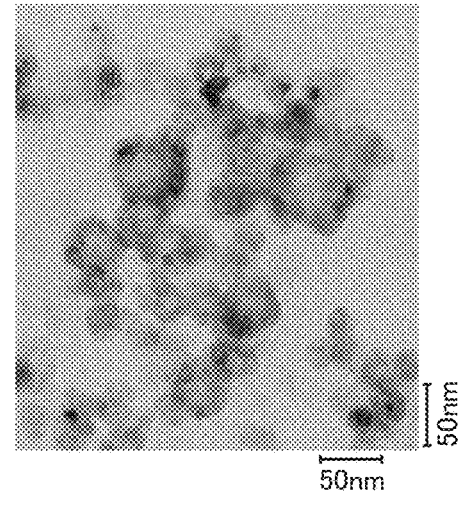
Figure 5F:
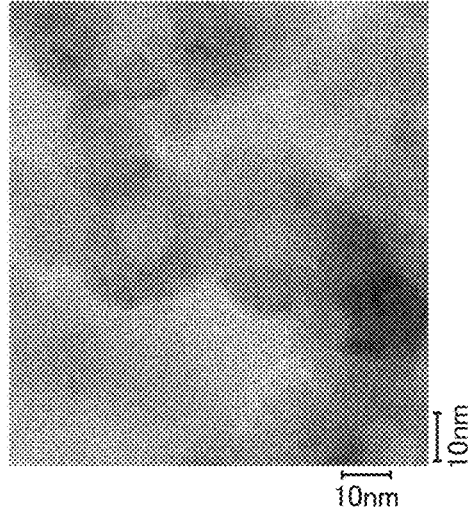

FIGS. 5(a) to 5(f) are corresponding to FIGS. 4(a) to 4(c). FIG. 5(a) is a schematic view showing a TEM image of the raw particles having yet to undergo treatment; FIG. 5(b) is an enlarged view of FIG. 5(a); FIG. 5(c) is a schematic view showing a TEM image of the raw particles having undergone oxidation treatment; FIG. 5(d) is an enlarged view of FIG. 5(c); FIG. 5(e) is a schematic view showing a TEM image of the magnetic particles; and FIG. 5(f) is an enlarged view of FIG. 5(e).

The oxidation treatment was performed in air at 300° C. for 4 hours.

The reduction treatment was performed in an atmosphere in which hydrogen is present, at 300° C. for 10 hours. To form the atmosphere in which hydrogen is present, H$_2$ gas (hydrogen gas) was used with an H$_2$ gas concentration of 100 vol %.

The nitridation treatment was performed in an ammonia gas atmosphere at 145° C. for 10 hours.

FIG. 4(a) shows a result of crystal structure analysis made on the raw particles, FIG. 5(a) is a TEM image of the raw particles, and FIG. 5(b) is an enlarged view of FIG. 5(a). The raw particles had the composition of Fe/SiO$_2$ as shown in FIG. 4(a), and had a core-shell structure as shown in FIGS. 5(a) and 5(b).

FIG. 4(b) shows a result of crystal structure analysis made on the raw particles having undergone oxidation treatment, FIG. 5(c) is a TEM image of the raw particles having undergone oxidation treatment, and FIG. 5(d) is an enlarged view of FIG. 5(c). Diffraction peaks of iron oxides are exhibited as shown in FIG. 4(b), and this means that iron (Fe) fine particles were oxidized. As shown in FIGS. 5(c) and 5(d), the raw particles having undergone oxidation treatment have a core-shell structure.

FIG. 4(c) shows a result of crystal structure analysis made on the obtained magnetic particles, FIG. 5(e) is a TEM image of the magnetic particles, and FIG. 5(f) is an enlarged view of FIG. 5(e). The cores of the raw particles were changed into iron nitride (Fe$_{16}$N$_2$) as shown in FIG. 4(c), and the magnetic particles have a core-shell structure as shown in FIGS. 5(e) and 5(f). In addition, the magnetic particles did not aggregate but disperse.

For comparison, raw particles (Fe/SiO$_2$ particles) with an average particle size of 33 nm, as a raw material, were subjected to reduction treatment and nitridation treatment in this order, without undergoing oxidation treatment. The raw particles having undergone reduction treatment and nitridation treatment, without undergoing oxidation treatment, were analyzed for their crystal structures by X-ray diffractometry, and the results were obtained as shown in FIGS. 6(a) and 6(b).

FIG. 6(a) shows a result of crystal structure analysis made on the raw particles that have been subjected to reduction treatment in a hydrogen gas (100 vol %) atmosphere at 300° C. for 3 hours and then nitridation treatment at 175° C. for 5 hours, without undergoing oxidation treatment. FIG. 6(b) shows a result of crystal structure analysis made on the raw particles that have been subjected to reduction treatment in a hydrogen gas (100 vol %) atmosphere at 300° C. for 3 hours and then nitridation treatment at 185° C. for 5 hours, without undergoing oxidation treatment. FIG. 6(c) shows a result of crystal structure analysis by X-ray diffractometry made on Fe$_{16}$N$_2$ serving as a reference. FIG. 6(d) shows a result of crystal structure analysis made on the raw particles. FIG. 6(e) is an enlarged view of a region D of FIG. 6(b).

Comparing FIGS. 6(a), 6(b) and 6(d) in which reduction treatment and nitridation treatment were performed whereas no oxidation treatment was performed, with FIG. 6(c) showing the reference, this reveals that in cases where reduction treatment and nitridation treatment were performed whereas no oxidation treatment was performed, in addition to Fe$_{16}$N$_2$, Fe$_4$N was also generated. In other words, an Fe$_{16}$N$_2$ single phase cannot be obtained without oxidation treatment.

The present invention is basically configured as above. While the method for manufacturing magnetic particles, the magnetic particles and the magnetic body according to the invention have been described above in detail, the invention is by no means limited to the foregoing embodiments and it should be understood that various improvements and modifications are possible without departing from the scope and spirit of the invention.

REFERENCE SIGNS LIST 10 magnetic particle
12, 22 fine particle 14, 24 silicon oxide layer
20 raw particle

The invention claimed is:

1. A magnetic particle manufacturing method, comprising:
   an oxidation treatment step of subjecting raw particles each having a core-shell structure in which a silicon oxide layer is formed on a surface of an iron fine particle to oxidation treatment;
   a reduction treatment step of subjecting the raw particles having undergone the oxidation treatment to reduction treatment; and
   a nitridation treatment step of subjecting the raw particles having undergone the reduction treatment to nitridation treatment to nitride iron fine particles with the core-shell structure being maintained,
   wherein the oxidation treatment step, the reduction treatment step, and the nitridation treatment step are performed by thermal treatment.

2. The magnetic particle manufacturing method according to claim 1, wherein the raw particles take on a spherical shape and have a particle size of less than 200 nm.

3. The magnetic particle manufacturing method according to claim 1, wherein the oxidation treatment is performed on the raw particles in air at 100° C. to 500° C. for 1 to 20 hours.

4. The magnetic particle manufacturing method according to claim 3, wherein the reduction treatment is performed at 100° C. to 500° C. for 1 to 20 hours as mixed gas of hydrogen gas and nitrogen gas is supplied to the raw particles.

5. The magnetic particle manufacturing method according to claim 4, wherein the nitridation treatment is performed at 140° C. to 200° C. for 3 to 50 hours as nitrogen element-containing gas is supplied to the raw particles.

6. The magnetic particle manufacturing method according to claim 5, wherein the raw particles take on a spherical shape and have a particle size of less than 200 nm.

7. The magnetic particle manufacturing method according to claim 4, wherein the raw particles take on a spherical shape and have a particle size of less than 200 nm.

8. The magnetic particle manufacturing method according to claim 3, wherein the nitridation treatment is performed at 140° C. to 200° C. for 3 to 50 hours as nitrogen element-containing gas is supplied to the raw particles.

9. The magnetic particle manufacturing method according to claim 8, wherein the raw particles take on a spherical shape and have a particle size of less than 200 nm.

10. The magnetic particle manufacturing method according to claim 3, wherein the raw particles take on a spherical shape and have a particle size of less than 200 nm.

11. The magnetic particle manufacturing method according to claim 1, wherein the reduction treatment is performed at 100° C. to 500° C. for 1 to 20 hours as mixed gas of hydrogen gas and nitrogen gas is supplied to the raw particles.

12. The magnetic particle manufacturing method according to claim 11, wherein the nitridation treatment is performed at 140° C. to 200° C. for 3 to 50 hours as nitrogen element-containing gas is supplied to the raw particles.

13. The magnetic particle manufacturing method according to claim 12, wherein the raw particles take on a spherical shape and have a particle size of less than 200 nm.

14. The magnetic particle manufacturing method according to claim 11, wherein the raw particles take on a spherical shape and have a particle size of less than 200 nm.

15. The magnetic particle manufacturing method according to claim 1, wherein the nitridation treatment is performed at 140° C. to 200° C. for 3 to 50 hours as nitrogen element-containing gas is supplied to the raw particles.

16. The magnetic particle manufacturing method according to claim 15, wherein the raw particles take on a spherical shape and have a particle size of less than 200 nm.

* * * * *